UNITED STATES PATENT OFFICE.

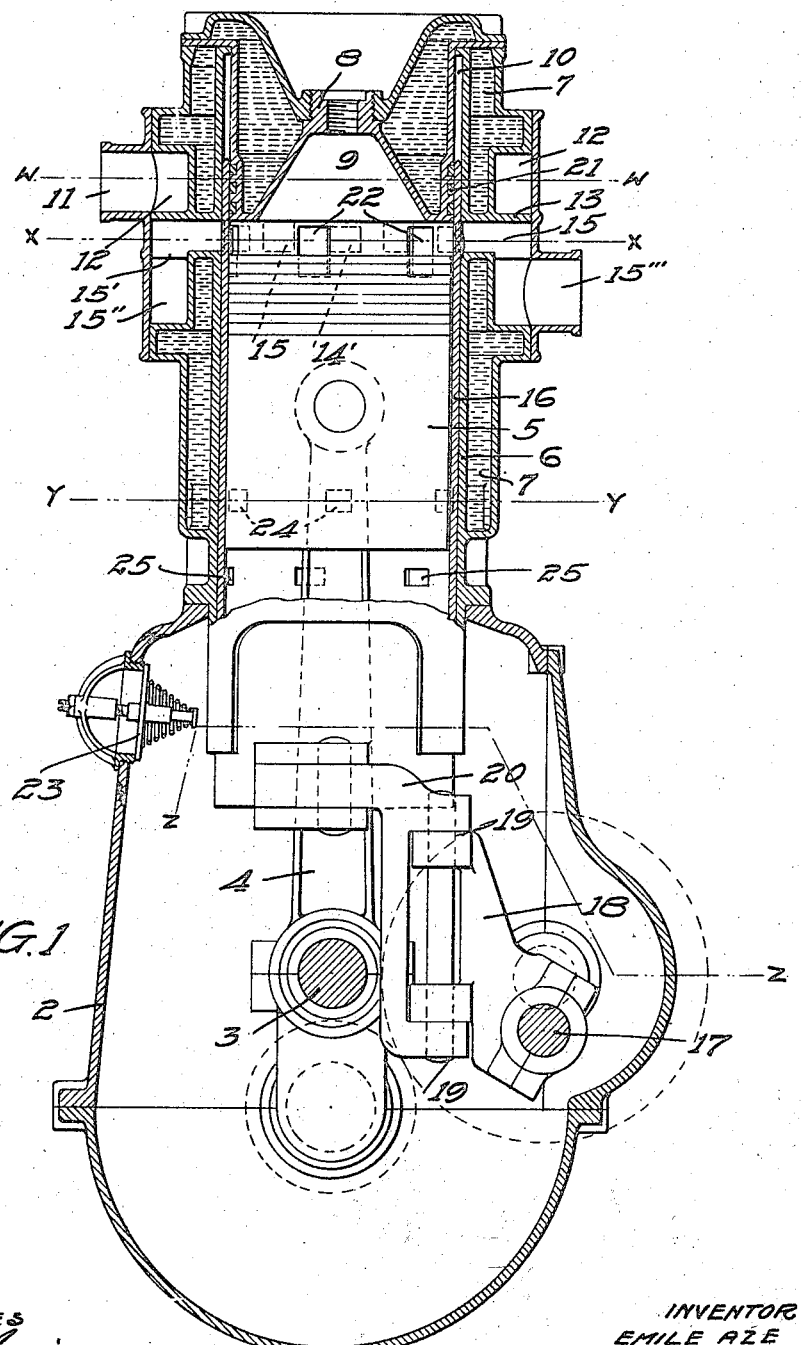

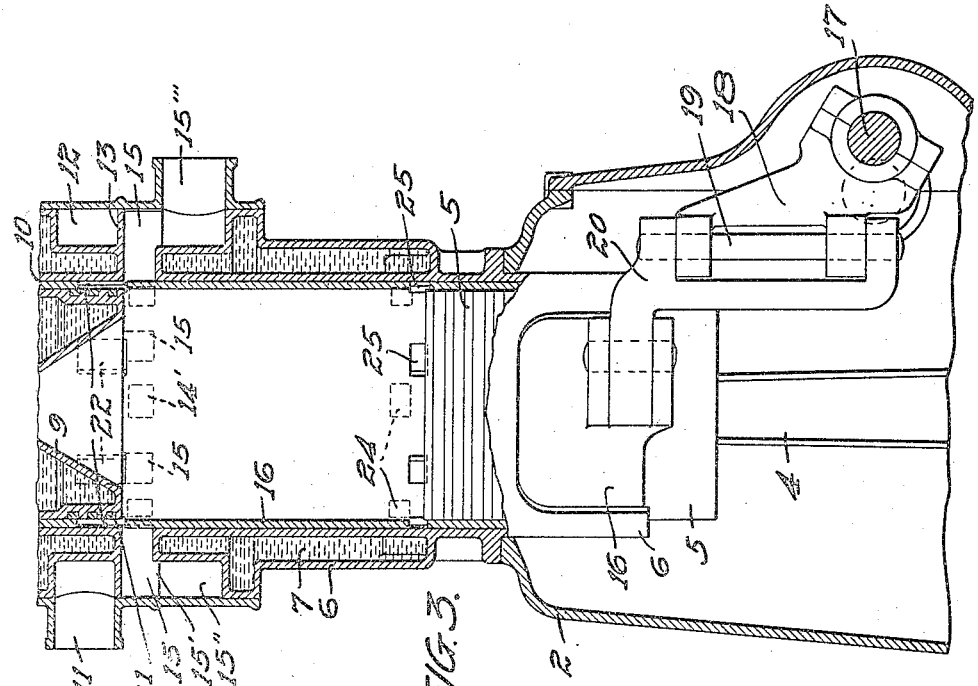
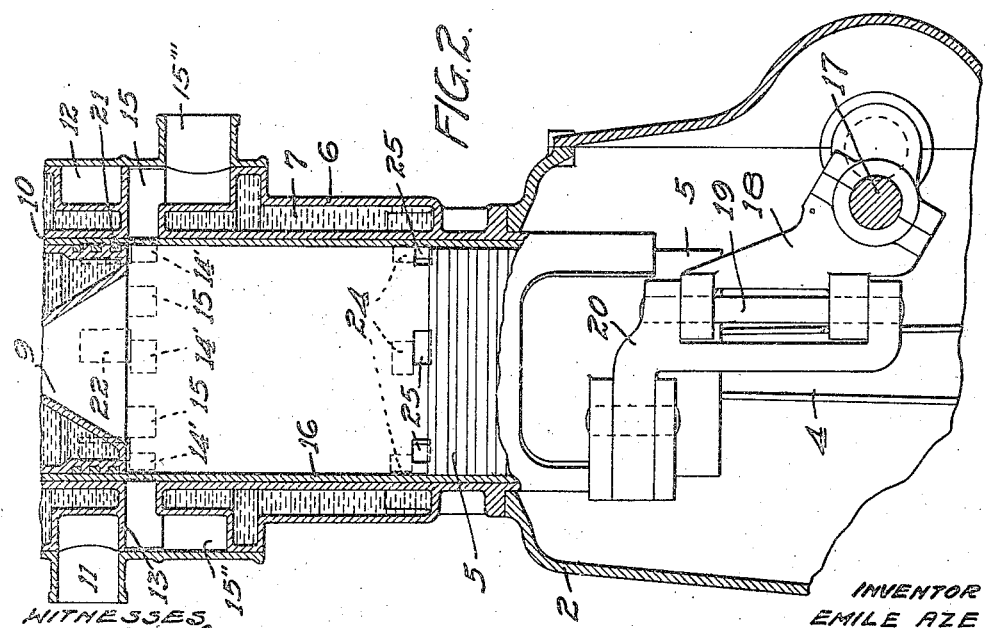

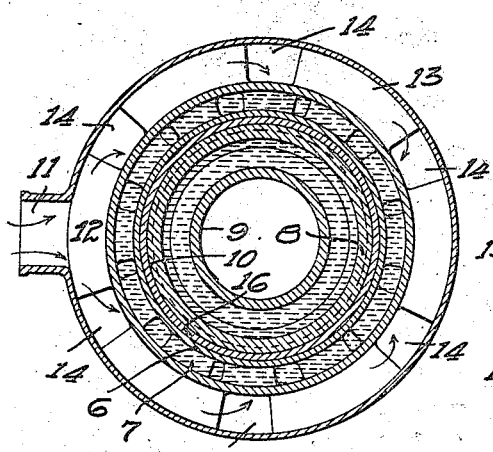
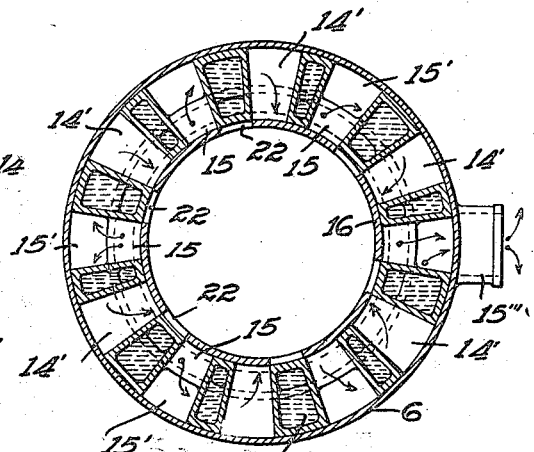
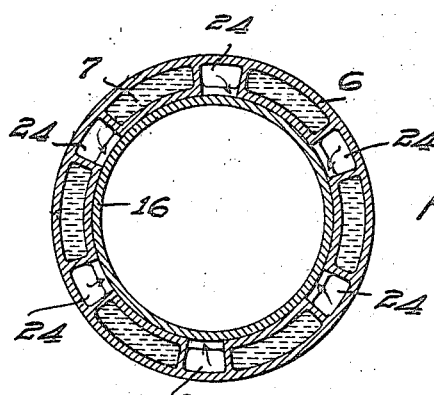
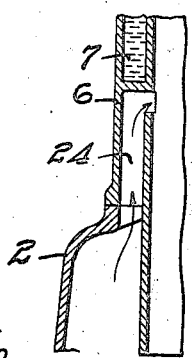
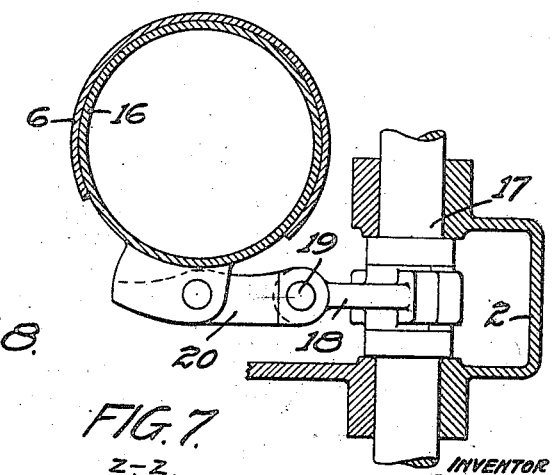

EMILE AZE, OF MINNEAPOLIS, MINNESOTA, ASSIGNOR OF ONE-FOURTH TO SAMUEL SWANSON AND ONE-FOURTH TO ALBERT T. LARSEN, OF MINNEAPOLIS, MINNESOTA.

GAS-ENGINE.

1,214,407.  Specification of Letters Patent.  Patented Jan. 30, 1917.

Application filed December 23, 1913. Serial No. 808,317.

*To all whom it may concern:*

Be it known that I, EMILE AZE, a citizen of the United States, resident of Minneapolis, in the county of Hennepin, State of Minnesota, have invented certain new and useful Improvements in Gas-Engines, of which the following is a specification.

My invention relates particularly to engines of four-cycle type, and the object of the invention is to dispense with valves usually used in connection with the cylinders of gas engines for controlling the admission of the fuel to the combustion chamber, to the end that the engine will be of more simple, economical construction and practically noiseless in operation.

A further object is to provide a gas engine in which the number of parts controlling the feed and exhaust to the cylinder are reduced to a minimum.

The invention consists generally in a single sleeve having a combined rotary and longitudinal movement for controlling the intake and exhaust ports of the cylinder.

Further the invention consists in various constructions and combinations, all as hereinafter described and particularly pointed out in the claim.

In the accompanying drawings forming part of this specification, Figure 1 is a vertical sectional view through the cylinder and crank case of a gas engine embodying my invention, the piston being illustrated on the suction stroke, Fig. 2 is a similar view showing the cylinder piston on the compression stroke, Fig. 3 illustrates the piston at the beginning of the exhaust or scavenging stroke, Fig. 4 is a sectional view on the line $w-w$ of Fig. 1, Fig. 5 is a similar view on the line $x-x$ of Fig. 1, Fig. 6 is a horizontal sectional view on the line $y-y$ of Fig. 1, Fig. 7 is a detail sectional view on the line $z-z$ of Fig. 1, Fig. 8 is a detail view of a portion of the wall of the cylinder showing the passage therein communicating with the crank case.

In the drawing, 2 represents the crank case of the engine cylinder provided with the usual crank shaft 3 and rod 4, to which the piston 5, mounted to reciprocate in the cylinder 6, is connected in the usual way. The cylinder has the usual water cooling chamber 7 formed therein and a head 8 having a cylindrical portion 9 projecting into the cylinder and spaced from the walls therein to form an annular chamber 10. The cylinder has an intake passage 11 leading from the manifold and through which the gas mixture is introduced into the combustion chamber of the cylinder. This passage communicates with an annular passage 12, which extends around the cylinder, the wall of the passage being separated from the wall of the cylinder by the water chamber above referred to.

The passage 12 has a wall 13 in the bottom thereof, provided at intervals with a series of openings 14 leading to inlet ports 14' provided in the wall of the cylinder, there being as many of these inlet ports as there are openings 14, and alternating in position with the exhaust ports 15, also provided in the wall of the cylinder, and each communicating through an opening 15' with an annular passage 15'' leading to the exhaust 15'''. As indicated in Fig. 4, there are six of the openings 14 communicating with a corresponding number of inlet ports beneath, and the cylinder is provided with a similar number of exhaust ports alternating with the inlet ports, making twelve in number of the combined inlet and exhaust ports, as shown in Fig. 5.

Between the piston 5 and the wall of the cylinder I provide a sleeve 16 mounted to have a combined longitudinal and rotary movement within the cylinder. The mechanism which I prefer to provide for operating this sleeve consists of a crank 17 operated through gearing indicated by dotted lines in Fig. 1 from the shaft 3, the movement of the shaft 3 with respect to the crank 17 being preferably in the ratio of two to one. A bracket 18 is secured on the crank 3 and has a hinged connection at 19 with a bracket 20 that is secured to the lower portion of the sleeve 16. This sleeve will move simultaneously with the piston 5, and has a combined longitudinal and rotary movement through its connection with the crank 17 operated from the shaft 3. The upper end of the sleeve is arranged to slide in the space 10, a suitable packing 21 being provided between the sleeve and the head 9 of the cylinder.

The upper portion of the sleeve is provided with a series of ports 22 arranged to slide by the intake and exhaust ports, the movement of the sleeve being timed so that its ports will register with the intake port 14' to receive a fresh charge of gas, while the exhaust ports will be temporarily closed. This opening of the inlet ports into the combustion chamber will take place on the suction stroke of the piston or when the first charge is drawn into the cylinder. The further movement of the sleeve and piston will cause the ports to be closed on the compression stroke and remain closed while the explosion of the charge takes place. On a scavenging stroke, or when the piston forces the burned gases from the cylinder, the ports 22 of the sleeve will temporarily register with the exhaust ports 15, and the gases will be expelled through these ports down into the passage 15" and from thence out to the exhaust opening.

It will, of course, be necessary to properly synchronize the movement of the piston and sleeve to provide for the opening and closing of the intake and exhaust ports at the proper moment of the stroke of the piston. This can be readily accomplished by regulating the longitudinal and rotary movement of the sleeve, proportionately to the travel of the piston.

In Fig. 1 the engine is illustrated on the suction stroke. The piston is moving down and the sleeve 16 and the ports 22 therein up and to the right, passages being formed from the cylinder through the ports 22 and 14' and the openings 14 with the chamber 12 and the inlet 11, the openings 14 being illustrated in Fig. 4 in the bottom of the passage 12.

In some cases I may wish to thin the mixture or charge for the engine by introducing a quantity of air into the cylinder, and I therefore provide an air intake valve 23 arranged to admit air to the crank case on the upstroke of the piston to be expelled therefrom on the down or suction stroke of the piston. The wall of the cylinder is provided with a series of ports 24 leading from the crank case, and the sleeve 16 has a series of ports 25 which are adapted to register with the ports 24 at a predetermined point in the stroke of the sleeve to allow the fresh air admitted to the crank case to be forced through the ports 24 and 25 into the combustion chamber of the cylinder to mingle with the gas charge therein.

The air will be taken into the crank case on the compression stroke of the piston, opening the valve 23 to permit the entrance of the air and at a predetermined point in the suction stroke the ports 24 and 25 will register and permit the fresh air from the crank case to enter the cylinder and mingle with the charge.

The air entering the crank case is regulated by the adjustment of the valve 23 and is utilized to thin the mixture of gas in the cylinder in case it is too rich, and I may thereby avoid the necessity of adjusting the carbureter.

Figs. 2 and 3 illustrate the relative position of the ports 24 and 25 in the stroke of the piston and the travel of the sleeve, these ports allowing the flow of air into the combustion chamber for a limited period and being entirely closed during the remainder of the stroke of the piston. The engine is on the compression stroke in Fig. 2, with the piston moving up, and the ports 22 moving up and toward the left, while in Fig. 3 the engine is on the exhaust stroke, with the piston moving up and the sleeve 16 with the ports 22 moving down and toward the right, passages being formed from the cylinder through the ports 22 and 15, the openings 15' and the passage 15" to the outlet 15'''.

The ports 24 and 25 may be utilized under certain conditions, if preferred, for introducing the air into the cylinder.

I claim as my invention:

A gas engine comprising a cylinder having intake and exhaust ports alternately arranged and communicating respectively with intake and exhaust passages, a piston for said cylinder, a sleeve interposed between said piston and the walls of said cylinder and having a plurality of ports and arranged to move diagonally with respect to said inlet and exhaust ports and alternately establish communication between said inlet passage and said cylinder and said cylinder and exhaust passage, said sleeve having air intake ports communicating with an auxiliary air supply for thinning the mixture.

In witness whereof, I have hereunto set my hand this 16th day of December, 1913.

EMILE AZE.

Witnesses:
EDWARD A. PAUL,
M. R. McINNIS.